United States Patent [19]

Ichikawa et al.

[11] Patent Number: 5,676,434
[45] Date of Patent: Oct. 14, 1997

[54] ANTI-SKID CONTROL BASED UPON ESTIMATED COEFFICIENT OF FRICTION

[75] Inventors: Hiroyuki Ichikawa, Okazaki; Shinsuke Sakane, Toyota; Toshihisa Kato, Anjo, all of Japan

[73] Assignee: Aisin Seiki Kabushiki Kaisha, Kariya, Japan

[21] Appl. No.: 503,937

[22] Filed: Jul. 19, 1995

[30] Foreign Application Priority Data

Jul. 20, 1994 [JP] Japan .................................. 6-190955

[51] Int. Cl.$^6$ ........................................... B60T 8/66
[52] U.S. Cl. ........................ 303/150; 303/163; 303/186
[58] Field of Search .......................... 303/150, 163, 303/186

[56] References Cited

U.S. PATENT DOCUMENTS

| | | | |
|---|---|---|---|
| 5,092,662 | 3/1992 | Okubo | 188/181 C |
| 5,385,393 | 1/1995 | Tanaka et al. | 303/150 |
| 5,411,325 | 5/1995 | Tanaka et al. | 303/150 |
| 5,413,405 | 5/1995 | Okazaki | 303/150 |

FOREIGN PATENT DOCUMENTS

| | | | |
|---|---|---|---|
| 0133598 | 2/1985 | European Pat. Off. . | |
| 4114345 | 11/1991 | Germany . | |
| 4219893 | 3/1993 | Germany . | |
| 60-35647 | 2/1985 | Japan . | |
| 3208758 | 7/1991 | Japan . | |
| 4345562 | 12/1992 | Japan | 303/150 |
| 5131912 | 10/1993 | Japan . | |
| 2258894 | 2/1993 | United Kingdom . | |

*Primary Examiner*—Peter M. Poon
*Attorney, Agent, or Firm*—Sughrue, Mion, Zinn, Macpeak & Seas, PLLC

[57] ABSTRACT

The invention is directed to an arrangement for controlling a braking force applied to each of front and rear road wheels of a vehicle depending upon a braking condition, with a hydraulic braking pressure supplied to each of the wheel brake cylinders through an actuator. The actuator is controlled by a braking force controller into which output signals of wheel speed sensors are fed. On the basis of the wheel speeds detected by the sensors, an estimated vehicle speed is calculated, and then a varying rate of the estimated vehicle speed is calculated. Furthermore, a wheel speed differential between the front and rear road wheels (or, a wheel slip rate differential therebetween) is calculated. Only when the wheel speed differential (or, the wheel slip rate differential) exceeds a predetermined value, the varying rate of the estimated vehicle speed is compared with a standard rate to estimate a coefficient of friction of the road surface. Then, the hydraulic braking pressure applied to each of the wheel brake cylinders is controlled by the braking force controller in accordance with the estimated coefficient of friction and in response to the each wheel speed.

10 Claims, 10 Drawing Sheets

ANTI-SKID CONTROL BASED UPON ESTIMATED COEFFICIENT OF FRICTION

BACKGROUND OF THE INVENTION

1. Field of the Invention

The present invention relates to an anti-skid control system for controlling the braking force applied to road wheels in a braking operation of an automotive vehicle to prevent the road wheels from being locked, and more particularly to an anti-skid control system for calculating a varying rate of an estimated vehicle speed to estimate a coefficient of friction of a road surface on the basis of the varying rate, and controlling the braking force in accordance with the coefficient of friction.

2. Description of the Prior Art

The coefficient of friction between the road surface and the road wheels is varied in dependence upon the kinds of road wheels, the road surface condition and the like. Especially, the coefficient of friction is varied to a large extent in dependence upon the conditions of the road on which a vehicle is running, such as a dry road surface and a wet road surface. Thus, it is very important to detect the coefficient of friction of the road surface (hereinafter, referred to as the road-CF). In this respect, when the vehicle is running, it is impossible to directly detect the road-CF. Therefore, according to an apparatus disclosed in Japanese Patent Laid-open publication No. 60-35647 for example, the road-CF is determined by comparing in magnitude a wheel speed and a wheel acceleration, with a standard speed and a standard acceleration of each wheel, respectively. However, in the apparatus disclosed in that publication, the road-CF is supposed to be estimated after the pressure decreasing operation in a wheel cylinder of each road wheel has been initiated, so that the road-CF is estimated only when the hydraulic braking pressure is being controlled. Therefore, it is impossible to estimate the road-CF before the pressure decreasing operation starts.

According to a hydraulic braking system employing a proportional control electromagnetic valve as disclosed in Japanese Patent Laid-open publication No. 3-208758, it has been proposed to detect the road-CF at the time of starting a braking pressure control for providing an appropriate braking pressure control at the time of starting the same in accordance with the road conditions. In practice, it is so arranged that the road-CF is estimated on the basis of an acceleration of a standard speed which is provided at the time when means for determining the necessity of the braking pressure control has determined the same to be initiated. That is, an estimated vehicle speed Vs is calculated on the basis of the maximum speed of the wheel speeds of the four road wheels before the braking pressure control is initiated, and an acceleration Vsd of the estimated vehicle speed Vs is calculated. Then, the road-CF is estimated on the basis of the acceleration Vsd thereby to provide a hydraulic braking pressure applied to each wheel cylinder.

In the above-described publication, however, the value of the hydraulic braking pressure which is provided when the braking pressure control is initiated, is unknown, and the road-CF which is estimated on the basis of a variation of the estimated vehicle speed Vs per a certain period of time, can not be estimated, if all the road wheels are locked simultaneously. In order to solve this problem, an anti-skid control apparatus has been proposed in Japanese Patent Laid-open publication No. 5-131912. This apparatus includes means for calculating the variation of the estimated vehicle speed per a certain period of time, means for estimating the coefficient of friction of the road by comparing the variation with a predetermined value, braking force control means for controlling an actuator in accordance with at least an estimated result of the coefficient of friction estimation means to control the hydraulic braking pressure fed to a wheel cylinder thereby to control the braking force applied to a road wheel, and means for adjusting the value of the coefficient of friction. This adjusting means is arranged to prevent the variation calculation means from calculating the variation of the estimated vehicle speed, when the variation has exceeded a predetermined value more than a predetermined number of times in a predetermined period of time before the braking pressure control is initiated by the braking force control means, whereby the coefficient of friction can be estimated, even if all the road wheels are locked simultaneously. However, according to the apparatus disclosed in the publication No. 5-131912, if the braking force is gradually applied to the road wheel for example, the wheel speed will be also gradually decreased, so that it is difficult to detect the locking condition of the road wheel until the wheel speed is decreased to a relatively low speed. Therefore, the anti-skid control operation might be delayed thereby to cause all the road wheels to be locked simultaneously.

Figure 11:
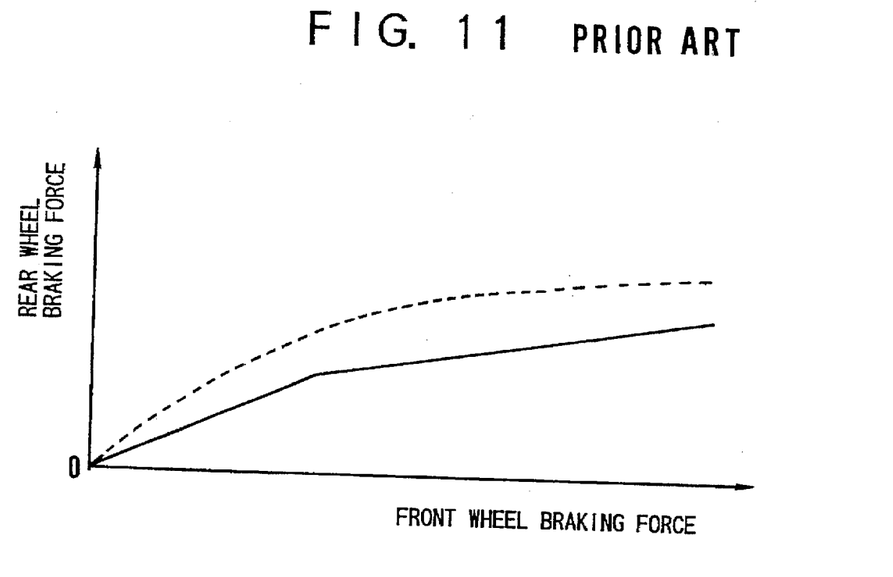
FIG. 11 is a diagram showing a braking force distribution between the front and rear road wheels according to a conventional braking apparatus.

In general, when a running vehicle is braked, the axle loads which are applied to the front and rear portions of the vehicle respectively, will be different from each other due to the moving load caused by the braking operation. Therefore, the braking force applied to a front road wheel and the braking force applied to a rear road wheel for locking all the road wheels simultaneously are not in direct proportion to each other, but in such a relationship as indicated by a phantom line in FIG. 11. This relationship is known as an ideal braking force distribution which varies depending upon the condition with or without load. If the braking force applied to the rear road wheel exceeds the braking force applied to the front road wheel, the directional stability of the vehicle will be deteriorated. In order to keep the braking force applied to the rear road wheel lower than that applied to the front road wheel and provide a distribution in close proximity to the ideal braking force distribution, a proportioning valve is provided between the rear wheel brake cylinder and the master cylinder. With this arrangement, a distribution characteristic has a bent portion as indicated by a solid line in FIG. 11. When the difference of the loads applied to the inner and outer road wheels of a turning vehicle is taken into consideration for example, it is necessary to reduce the braking force applied to the rear road wheel much lower than the braking force applied to the front road wheel.

Figure 12:
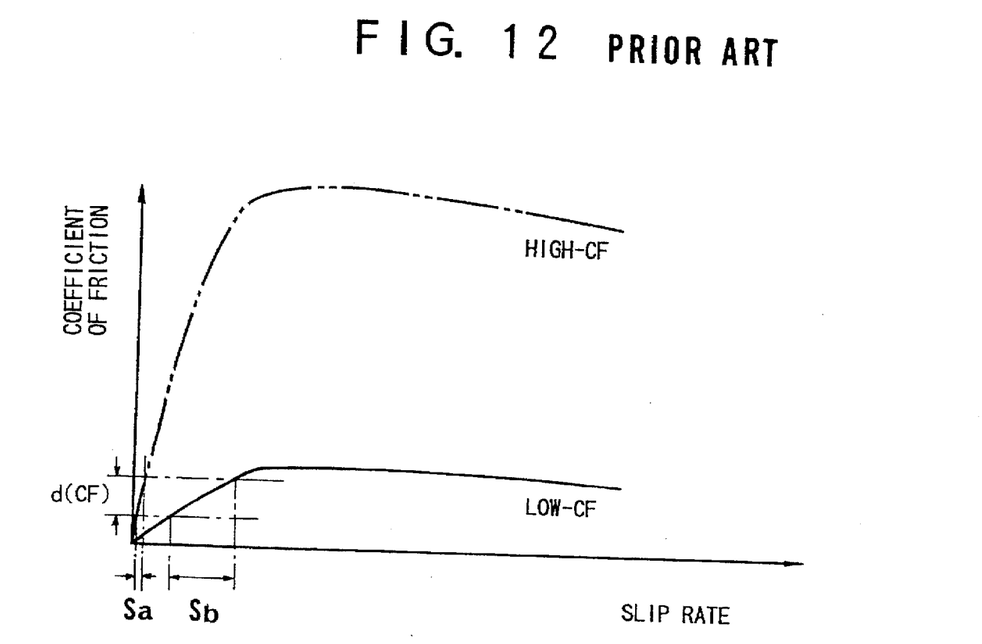
FIG. 12 is a diagram showing a conventional characteristic of a coefficient of friction—slip rate.

FIG. 12 illustrates a conventional characteristic of a coefficient of friction—slip rate (CF-S), wherein the anti-skid control is initiated just after the coefficient of friction reaches its peak value. Considering the slip rate up to the peak value, the slip rate differential (Sb) caused when the vehicle is running on the road surface of a relatively low coefficient of friction as indicated by a solid line in FIG. 12, becomes larger than the slip rate differential (Sa) caused when the vehicle is running on the road surface of a relatively high coefficient of friction as indicated by a two-dotted chain line, with respect to the same varying rate d(CF) of the coefficient of friction. Therefore, the decreasing rate of the wheel speed of the front road wheel running on a relatively low coefficient of friction (as indicated by a one-dotted chain line Vwf in FIG. 8) becomes larger than that of the front road wheel running on the high coefficient of friction (as indicated by a solid line Vwf in FIG. 8). Also, the speed differential between the wheel speed of the front road wheel and the wheel speed of the rear road wheel (as indicated by a phantom line Vwr in FIG. 8) caused when the vehicle is running on the low coefficient of friction is larger than that caused when the vehicle is running on the high coefficient of friction.

As a result, in the case where the road-CF is estimated in accordance with the variation of the estimated vehicle speed in a predetermined period of time, i.e., the varying rate (or, vehicle deceleration), it is preferable to employ the wheel speed differential between the front and rear road wheels as a parameter. Whereby, if the wheel speed differential is caused to exceed a predetermined value, it is possible to estimate the road-CF on the basis of the varying rate of the estimated vehicle speed, well before the anti-skid control is initiated.

SUMMARY OF THE INVENTION

Accordingly, it is an object of the present invention to provide an anti-skid control system wherein a coefficient of friction of a road surface is estimated on the basis of the varying rate of an estimated vehicle speed, and wherein the coefficient of friction is properly estimated before a braking pressure control is initiated.

In accomplishing the above and other objects, an anti-skid control system for controlling a braking force applied to road wheels of an automotive vehicle comprises wheel brake cylinders operatively connected to front and rear road wheels of the vehicle, respectively, for applying braking force thereto, a hydraulic pressure generator for supplying a hydraulic braking pressure to each of the wheel brake cylinders, actuating means which is disposed in each hydraulic circuit communicating the hydraulic pressure generator with each of the wheel brake cylinders for controlling the hydraulic braking pressure in each of the wheel brake cylinders, and wheel speed detection means for detecting wheel speeds of the road wheels, and providing output signals corresponding to the wheel speeds, respectively. The anti-skid control system is provided with vehicle speed estimation means for calculating an estimated vehicle speed on the basis of the wheel speeds detected by the wheel speed detection means, varying rate calculation means for calculating a varying rate of the estimated vehicle speed, front and rear wheels comparison means for comparing the rotational conditions of the front road wheels and the rear road wheels on the basis of at least the wheel speeds detected by the wheel speed detection means, and coefficient of friction estimation means for estimating a coefficient of friction of a road on which the vehicle is running, on the basis of the result of a comparison between the output of the varying rate calculation means and a standard rate. The coefficient of friction estimation means is allowed to estimate the coefficient of friction of the road, only when the front and rear wheels comparison means results in providing more than a predetermined difference between the rotational conditions of the front road wheels and the rear road wheels. The braking force control means is provided for controlling the actuating means in accordance with at least the coefficient of friction estimated by the coefficient of friction estimation means, and in response to the wheel speeds detected by the wheel speed detection means, thereby to control the braking force applied to each of the road wheels.

In the above-described anti-skid control system, the front and rear wheels comparison means preferably comprises speed differential calculation means for calculating a wheel speed differential between the front wheel speed provided for the front road wheels and the rear wheel speed provided for the rear road wheels on the basis of the wheel speeds detected by the wheel speed detection means. It is so arranged that the coefficient of friction estimation means estimates the coefficient of friction of the road on the basis of the result of a comparison between the output of the varying rate calculation means and the standard rate, and that the comparison is made only when the output of the speed differential calculation means exceeds a predetermined value.

The front and rear wheels comparison means may comprise slip rate differential calculation means for calculating a wheel slip rate differential between the front wheel slip rate provided for the front road wheels and the rear wheel slip rate provided for the rear road wheels on the basis of the wheel speeds detected by the wheel speed detection means and the output of the vehicle speed estimation means, and it may be so arranged that the coefficient of friction estimation means estimates the coefficient of friction of the road on the basis of the result of a comparison between the output of the varying rate calculation means and the standard rate, and that the comparison is made only when the output of the slip rate differential calculation means exceeds a predetermined value.

In the anti-skid control systems as describe above, the vehicle speed estimation means preferably includes means for modifying the estimated vehicle speed in accordance with the output of the coefficient of friction estimation means.

BRIEF DESCRIPTION OF THE DRAWINGS

The above stated objects and following description will become readily apparent with reference to the accompanying drawings, wherein like reference numerals denote like elements, and in which.

DESCRIPTION OF THE PREFERRED EMBODIMENTS

Figure 1:
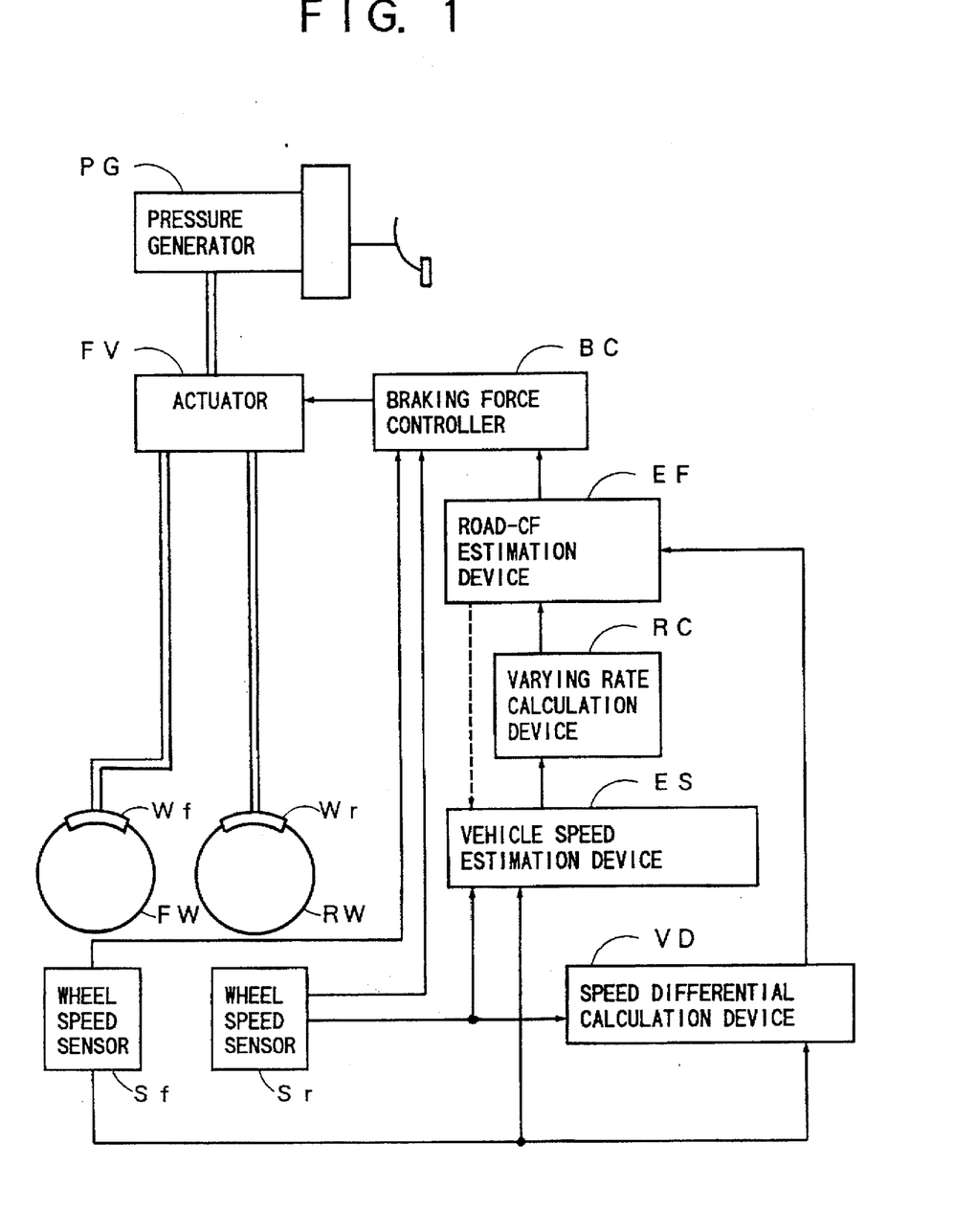
FIG. 1 is a general block diagram illustrating an anti-skid control system according to the present invention.

Referring to FIG. 1, there is schematically illustrated an anti-skid control system according to the present invention, which controls a braking force applied to each of a front road wheel FW and a rear road wheel RW of a vehicle depending upon a braking condition. In this anti-skid control system, it is so arranged that when the hydraulic pressure generator PG is operated, a hydraulic braking pressure is supplied from the pressure generator PG to each of wheel brake cylinders Wf, Wr through an actuator FV, so that a braking force is applied to each of the road wheels FW and RW. And, wheel speeds of the front and rear road wheels FW and RW are detected by wheel speed sensors Sf, Sr, respectively. On the basis of those wheel speeds, an estimated vehicle speed is calculated by a vehicle speed estimation device ES, and a varying rate of the estimated vehicle speed is calculated by a varying rate calculation device RC. Furthermore, a wheel speed differential between the wheel speeds of the road wheels FW and RW is calculated by a speed differential calculation device VD on the basis of the outputs of the wheel speed sensors Sf, Sr. Then, if the wheel speed differential calculated by the device VD exceeds a predetermined value, the varying rate is compared with a predetermined rate, so that a coefficient of friction of the road surface, on which the vehicle is running, is estimated by a road-CF estimation device EF on the basis of the result of the comparison of the varying rate with the predetermined rate. The actuator FV is controlled by the braking force controller BC, to which the device EF is connected, and into which output signals of the wheel speed sensors Sf, Sr are fed. The hydraulic braking pressure applied to each of the wheel brake cylinders Wf, Wr is controlled by the braking force controller BC in accordance with the estimated coefficient of friction and in response to each wheel speed.

Figure 2:
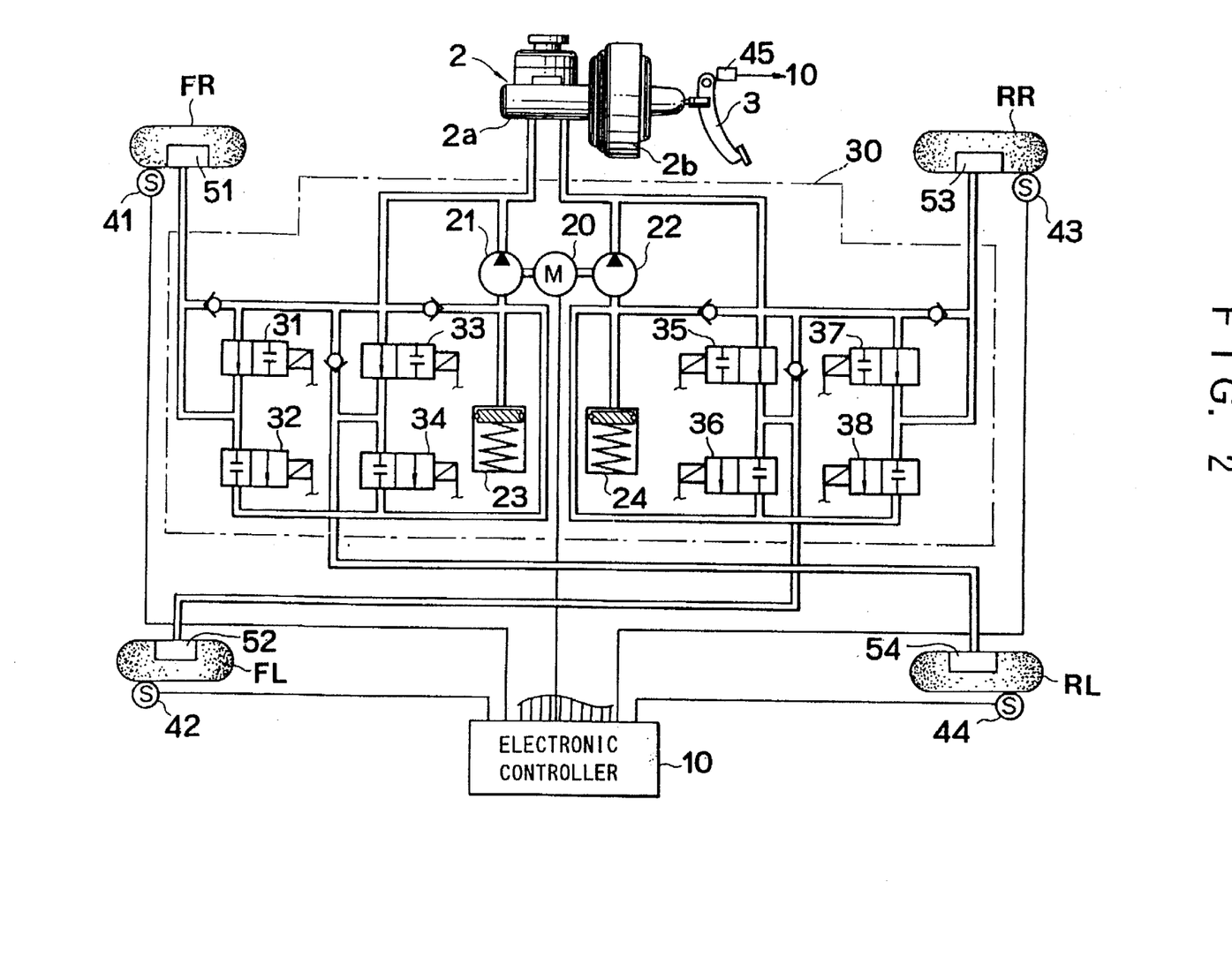
FIG. 2 is a schematic block diagram of an anti-skid control system of an embodiment of the present invention.

More specifically, the details of the embodiment disclosed in FIG. 1 are illustrated in FIGS. 2–7. Referring to FIG. 2, pumps 21, 22, reservoirs 23, 24 and solenoid valves 31 to 38 are disposed in hydraulic circuits for connecting a hydraulic pressure generator 2, which comprises a master cylinder 2a and a booster 2b operated in response to a depression of a brake pedal 3, to wheel brake cylinders 51 to 54 operatively connected to the road wheels FR, FL, RR and RL, respectively. The road wheel FR designates a road wheel at the fore right side as viewed from the position of a driver's seat, the road wheel FL designates a road wheel at the fore left side, the road wheel RR designates a road wheel at the rear right side, and the road wheel RL designates a road wheel at the rear left side. In the present embodiment, the rear road wheels RR, RL are connected with the front road wheels FR, FL through a so-called center differential system (not shown), so that all the road wheels are driven wheels to provide a 4 WD (four-wheel drive) system. With respect to a braking system, a diagonal hydraulic dual circuits system has been formed as shown in FIG. 2.

Between the hydraulic pressure generator 2 and wheel brake cylinders 51 to 54, there is disposed an actuator 30 which corresponds to the actuator FV in FIG. 1. The actuator 30 includes the solenoid valves 31, 32 and solenoid valves 33, 34 which are disposed respectively in the hydraulic circuits for connecting one output port of the master cylinder 2a to the wheel brake cylinders 51, 54, and the pump 21 is disposed between the master cylinder 2a and the solenoid valves 31 to 34. Similarly, the solenoid valves 35, 36 and solenoid valves 37, 38 are disposed respectively in the hydraulic circuits for connecting the other output port of the master cylinder 2a to the wheel brake cylinders 52, 53, and the pump 22 is disposed between the master cylinder 2a and the solenoid valves 35 to 38. The pumps 21, 22 are driven by an electric motor 20, so that the brake fluid raised to a predetermined pressure is supplied to these hydraulic circuits. Accordingly, these hydraulic circuits serve as the circuits through which the hydraulic braking pressure is supplied to the normally open solenoid valves 31, 33, 35 and 37. The hydraulic circuits at the drain side of the normally closed solenoid valves 32, 34 are connected to the pump 21 through the reservoir 23, and the hydraulic circuits at the drain side of the solenoid valves 36, 38 are connected to the pump 22 through the reservoir 24. Each of the reservoirs 23, 24 is provided with a piston and a spring, and functions so as to store the brake fluid returned from each of the solenoid valves 32, 34, 36 and 38 through the hydraulic circuits at the drain side thereof, and to supply the brake fluid to each of those solenoid valves when the pumps 21, 22 operate.

Each of the solenoid valves 31 to 38 is a two-port two-position solenoid operated changeover valve, and is in its first operating position as shown in FIG. 2 when a current is not fed to its solenoid coil, so that each of the wheel brake cylinders 51 to 54 is communicated with the hydraulic pressure generator 2 and the pump 21 or 22. When the current is fed to the solenoid coil, each solenoid valve is changed over to its second operating position, so that each of the wheel brake cylinders 51 to 54 is shut off from the communication with the hydraulic pressure generator 2 and the pump 21 or 22, and is communicated with the reservoir 23 or 24. Check valves shown in FIG. 2 permit the brake fluid to return from each of the wheel brake cylinders 51 to 54 and the reservoirs 23, 24 to the hydraulic pressure generator 2, and blocks the counterflow of the brake fluid.

Accordingly, with each of the solenoid valves 31 to 38 energized or de-energized, the hydraulic braking pressure in each of the wheel brake cylinders 51 to 54 is decreased, held or increased. Namely, when the current is not fed to the solenoid coil of each of the solenoid valves 31 to 38, the hydraulic braking pressure is supplied from the hydraulic pressure generator 2 and the pump 21 or 22 to each of the wheel brake cylinders 51 to 54 to increase the hydraulic braking pressure in each wheel brake cylinder. On the other hand, when the current is fed to the solenoid coil, each of the wheel brake cylinders 51 to 54 is communicated with the reservoir 23 or 24 to decrease the hydraulic braking pressure in each wheel brake cylinder. Further, when the current is fed only to the solenoid coils of the solenoid valves 31, 33, 35 and 37, the hydraulic braking pressure in each wheel brake cylinder is held. Therefore, by adjusting the time intervals of energization and de-energization of the solenoid valves, it is possible to provide a so-called pulse-increase mode (step-increase mode) or a pulse-decrease mode so as to gradually increase or decrease the hydraulic braking pressure.

The above-described solenoid valves 31 to 38 are electrically connected to the electronic controller 10 which controls the operation of the solenoid valves 31 to 38. The electric motor 20 is also connected to the electronic controller 10, so that the operation of the electric motor 20 is controlled by the electronic controller 10. At the road wheels FR, FL, RR and RL, there are provided wheel speed sensors 41 to 44 respectively, which are connected to the electronic controller 10, and by which a signal corresponding to a rotational speed of each road wheel, i.e., a wheel speed signal is fed to the electronic controller 10. Each of the wheel speed sensors 41 to 44 in the present embodiment is a well known sensor of electromagnetic induction type which comprises a pick-up having a coil wound around a permanent magnet and a rotor having an outer peripheral end thereof provided with teeth, and functions to output a voltage with a frequency proportional to the rotational speed of each road wheel, while other types of sensor may be used, instead of the above-described sensor. There is also provided a brake switch 45 which is turned on when the brake pedal 3 is depressed, and turned off when the brake pedal 3 is released, and which is electrically connected to the electronic controller 10.

Figure 3:
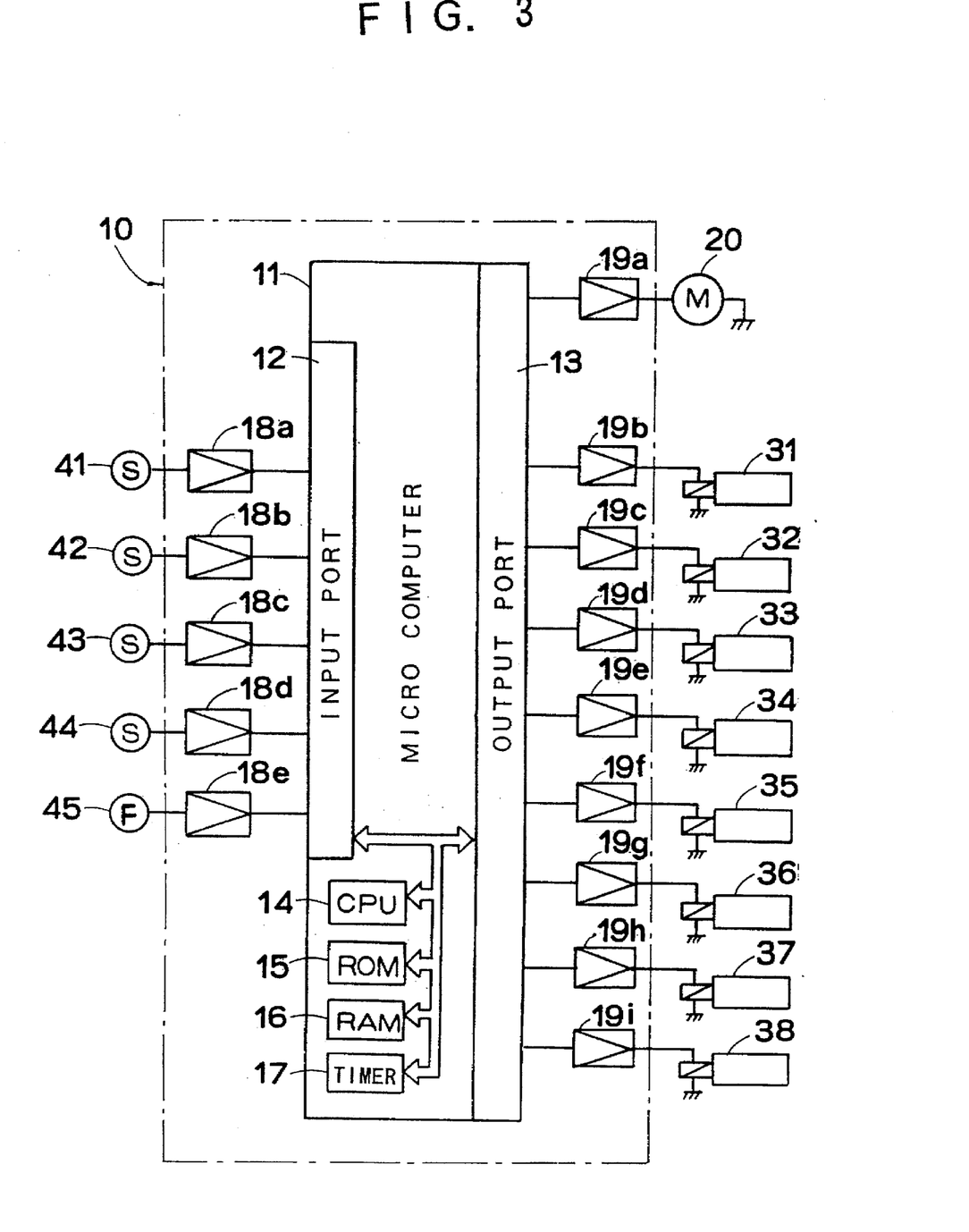
FIG. 3 is a block diagram illustrating the arrangement of an electronic controller shown in FIG. 2.

As shown in FIG. 3, the electronic controller 10 is provided with a microcomputer 11 having a central processing unit or CPU 14, a read-only memory or ROM 15, a random access memory or RAM 16 and a timer 17, which are connected with an input port 12 and an output port 13 via a common bus to execute the input/output operations relative to external circuits. The signals detected by each of the wheel speed sensors 41 to 44 and the brake switch 45 are fed to the input port 12 via respective amplification circuits 18a to 18e and then to the CPU 14. Then, a control signal is output from the output port 13 to the electric motor 20 via a drive circuit 19a, and control signals are fed to the solenoid valves 31 to 38 via the respective drive circuits 19b to 19i. In the microcomputer 11, the ROM 15 memorizes a program corresponding to flowcharts shown in FIGS. 4 to 7, the CPU 14 executes the program while the ignition switch (not shown) is closed, and the RAM 16 temporarily memorizes variable data necessary for executing the program.

Figure 4:
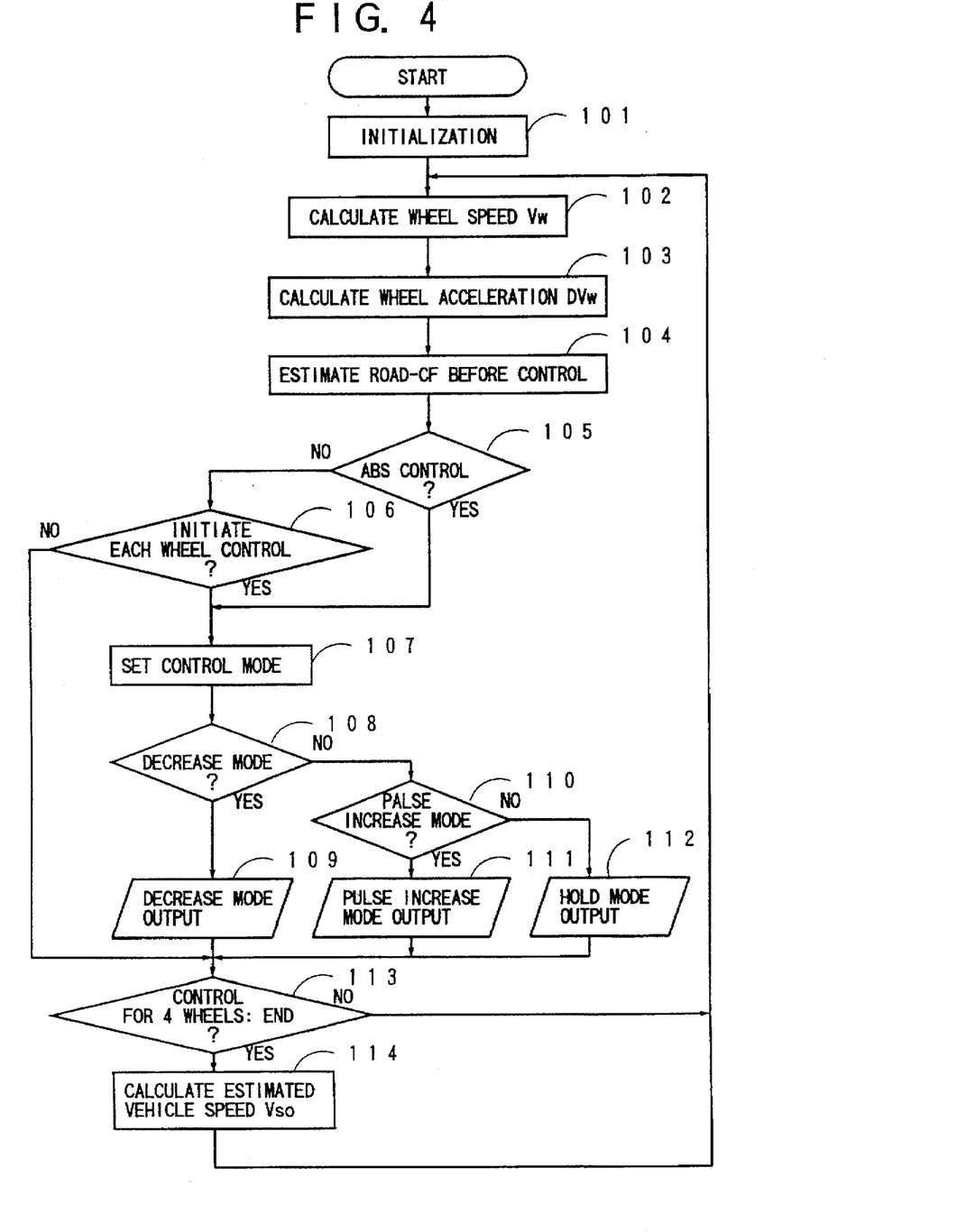
FIG. 4 is a flowchart showing the operation of the braking force control of the electronic controller according to the above embodiment of the present invention.

A program routine executed by the electronic controller 10 for the anti-skid control will now be described with reference to FIGS. 4–7. FIG. 4 is a flowchart showing a main routine executed in accordance with a program of one embodiment of the present invention. The program routine corresponding to the flowcharts as shown in FIGS. 4–7 starts when an ignition switch (not shown) is turned on, and provides for initialization of the system at Step 101 to clear various data such as a wheel speed Vw, a wheel acceleration DVw or the like. At Step 102, the wheel speed Vw is calculated in accordance with the output signal from each of the wheel speed sensors 41 to 44, and then the wheel acceleration DVw is calculated from the wheel speed Vw at Step 103. Next, at Step 104, a coefficient of friction of a road surface is estimated before an anti-skid control is initiated, so that one of a high-CF, mid-CF and low-CF is selected for the coefficient of friction of the road surface on which the vehicle is running, as described in detail later with reference to FIG. 5.

Then, the program proceeds to Step 105 where it is determined whether each of the road wheels is under the anti-skid control (abbreviated as ABS control as shown in FIG. 4), or not. If it is determined that the anti-skid control is being made, the program proceeds to Step 107, otherwise proceeds to Step 106, where it is determined whether the conditions for initiating the anti-skid control are fulfilled or not. If it is determined that the conditions have not been fulfilled, the program jumps to Step 113. In Step 107, on the basis of the braking conditions determined by the wheel speed Vw, the wheel acceleration DVw and an estimated vehicle speed Vs which will be described later, and the coefficient of friction of the road surface estimated at Step 104, one of decrease mode, hold mode, pulse-increase mode and increase mode is selected. And, at Step 108, it is determined if the selected control mode is the decrease mode. If so, the program proceeds to Step 109 where a decrease mode signal is output. Otherwise, the program proceeds to Step 110 where it is determined if the selected control mode is the pulse-increase mode, and if so, the program proceeds to Step 111, where the pulse-increase mode signal for alternately increasing and decreasing the hydraulic braking pressure is output, thereby to increase the hydraulic braking pressure in the wheel brake cylinder under control, out of the wheel brake cylinders 51 to 54, gradually. If the control mode is not the pulse-increase mode, the program proceeds to Step 112 where the hold mode signal is output, thereby to hold the hydraulic braking pressure in the wheel brake cylinder (hereinafter, simply referred to as the wheel cylinder pressure).

The above-described steps for selecting the control mode and producing the output signals are executed for each wheel cylinder. Then, at Step 113, it is determined whether the steps have been executed with respect to all the four wheels FR, FL, RR, RL, and the above-described routine is repeated until the ABS control is executed with respect to all the road wheels. Thereafter, the program proceeds to Step 114, where the estimated vehicle speed Vso is calculated and then returns to Step 102.

Figure 5:
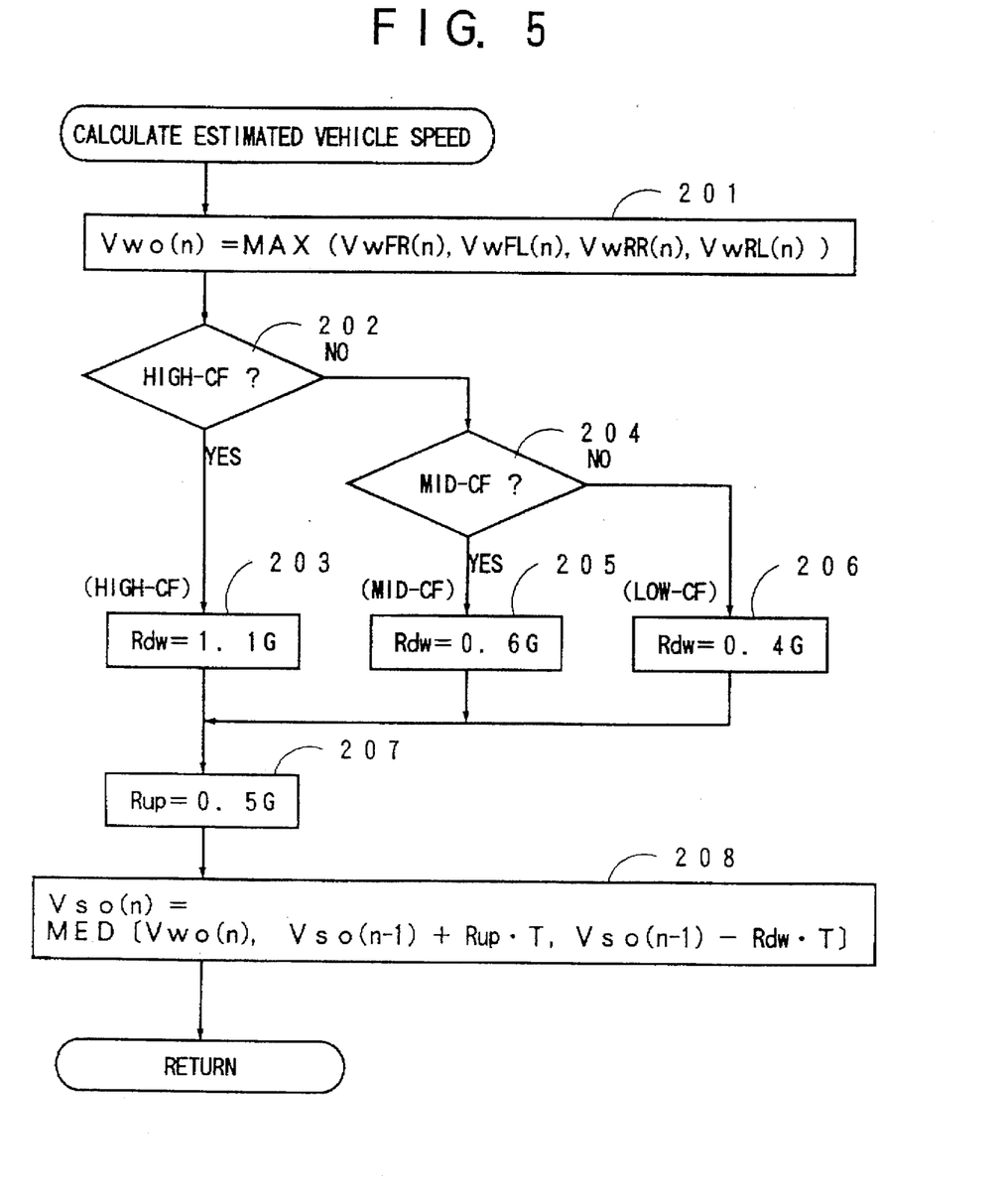
FIG. 5 is a flowchart showing the calculation of the estimated vehicle speed according to the above embodiment of the present invention.

The estimated vehicle speed Vso is calculated according to the flowchart as shown in FIG. 5 as follows. At the outset, the maximum value of the wheel speeds VwFR(n) etc. of the four road wheels is calculated at Step 201 every control cycle, e.g., 5 milliseconds to provide the maximum wheel speed Vwo(n). In FIG. 5, "MAX" designates a function for calculating the maximum value of various data, and "FR" or the like designates the wheel on which the wheel speed was calculated. "(n)" designates the value which was obtained at the n'th cycle, wherein "n" is an integral mumber equal to or more than one. Then, the program proceeds to Step 202 where the coefficient of friction of the road on which the vehicle is running is determined in accordance with the result of the estimation executed at Step 104. If the coefficient of friction of the road (the road-CF) is determined to correspond to a relatively high value of the coefficient of friction (i.e., a high-CF), the program proceeds to Step 203 where a deceleration Rdw is set to a predetermined value, e.g., 1.1 G (wherein "G" represents a gravity acceleration). If it is not determined that the road-CF corresponds to the high-CF, the program proceeds to Step 204 where it is determined if the road-CF corresponds to a mid-CF. If the road-CF corresponds to the mid-CF, the program proceeds to Step 205 where the deceleration Rdw is set to 0.6 G for example, otherwise the program proceeds to Step 206 where the road-CF is determined to correspond to the low-CF, so that the deceleration Rdw is set to 0.4 G for example. Thereafter, the program proceeds to Step 207 where the acceleration Rup is set to 0.5 G for example, and further proceeds to Step 208 where the estimated vehicle speed Vso(n) is calculated. That is, the intermediate or middle value is selected to provide the estimated vehicle speed Vso(n), out of the maximum wheel speed Vwo(n) obtained at Step 201, the estimated vehicle speed Vso(n−1) at the previous cycle with the value obtained by multiplying the acceleration Rup and the cycle period T added to it, i.e., Vso(n−1)+Rup·T, and the estimated vehicle speed Vso(n−1) at the previous cycle with the value obtained by multiplying the deceleration Rdw and the cycle period T subtracted from it, i.e., Vso(n−1)−Rdw·T. In FIG. 5, "MED" designates a function for obtaining the intermediate value.

Figure 6:
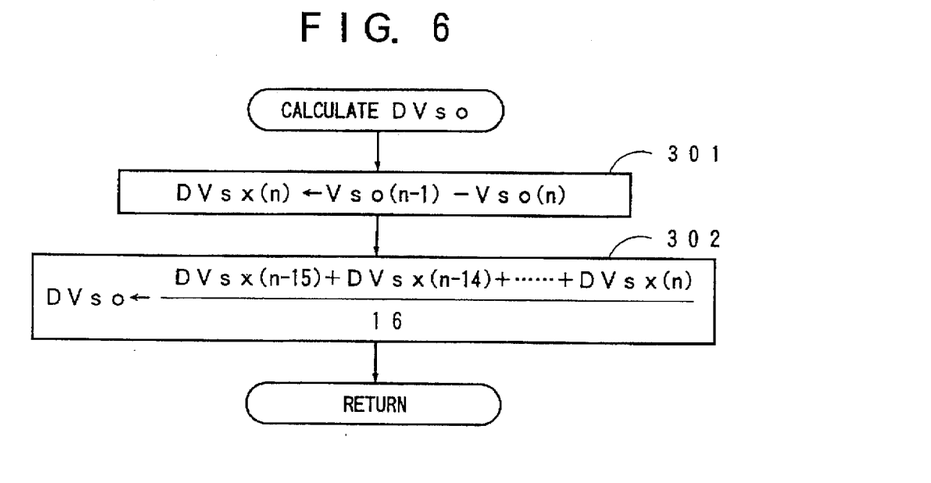
FIG. 6 is a flowchart showing the calculation of the varying rate of the estimated vehicle speed according to the above embodiment.

FIG. 6 shows a subroutine for calculating the varying rate DVso of the estimated vehicle speed Vso. At Step 301, the estimated vehicle speed Vso(n) at the present cycle (n) is subtracted from the estimated vehicle speed Vso(n−1) at the previous cycle (n−1) to provide a difference therebetween, i.e., Vso(n−1)−Vso(n), which corresponds to a varying rate DVsx(n) at the present cycle. Then, the program proceeds to Step 302, where the average of the varying rates DVsx which are obtained during the period of 16 cycles from the cycle (n−15) to the cycle (n), for example, is calculated to provide the varying rate DVso. This varying rate DVsx(n) is varied in dependence upon the wheel vibration and the like, so that the varying rates for 16 cycles (80 milliseconds in total, according to the present embodiment) are used for obtaining the average.

Figure 7:
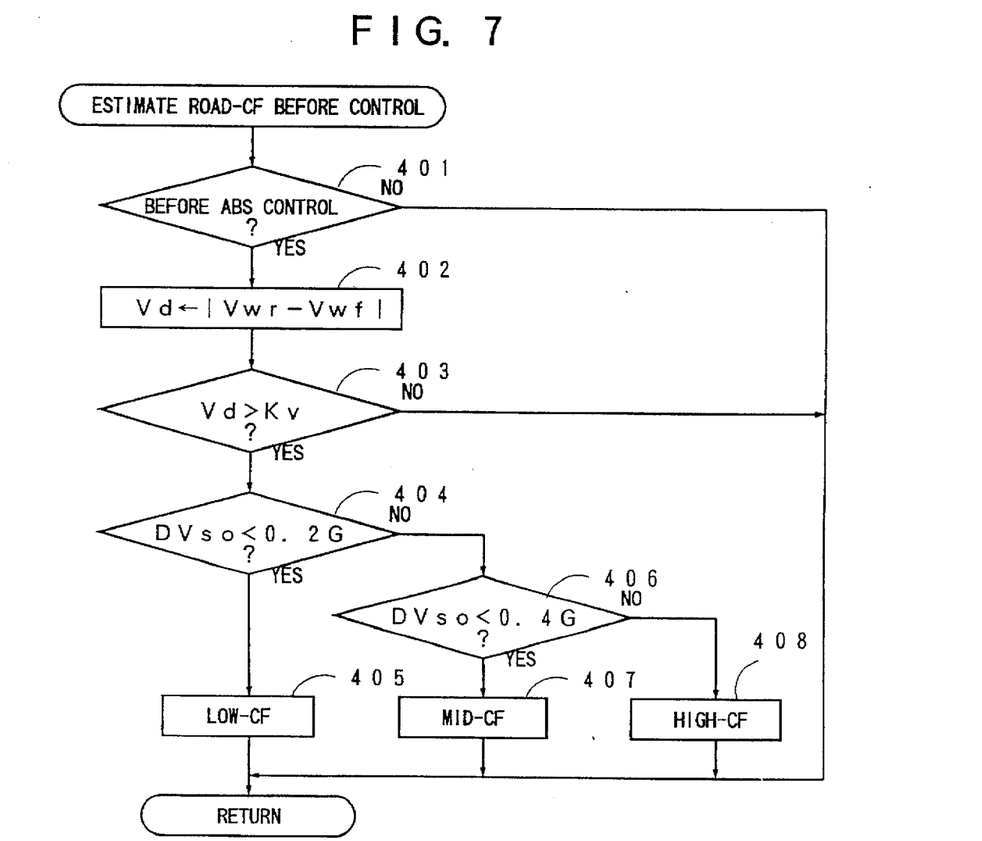
FIG. 7 is a flowchart showing the estimation of the coefficient of friction before the anti-skid control is initiated.
Figure 8:
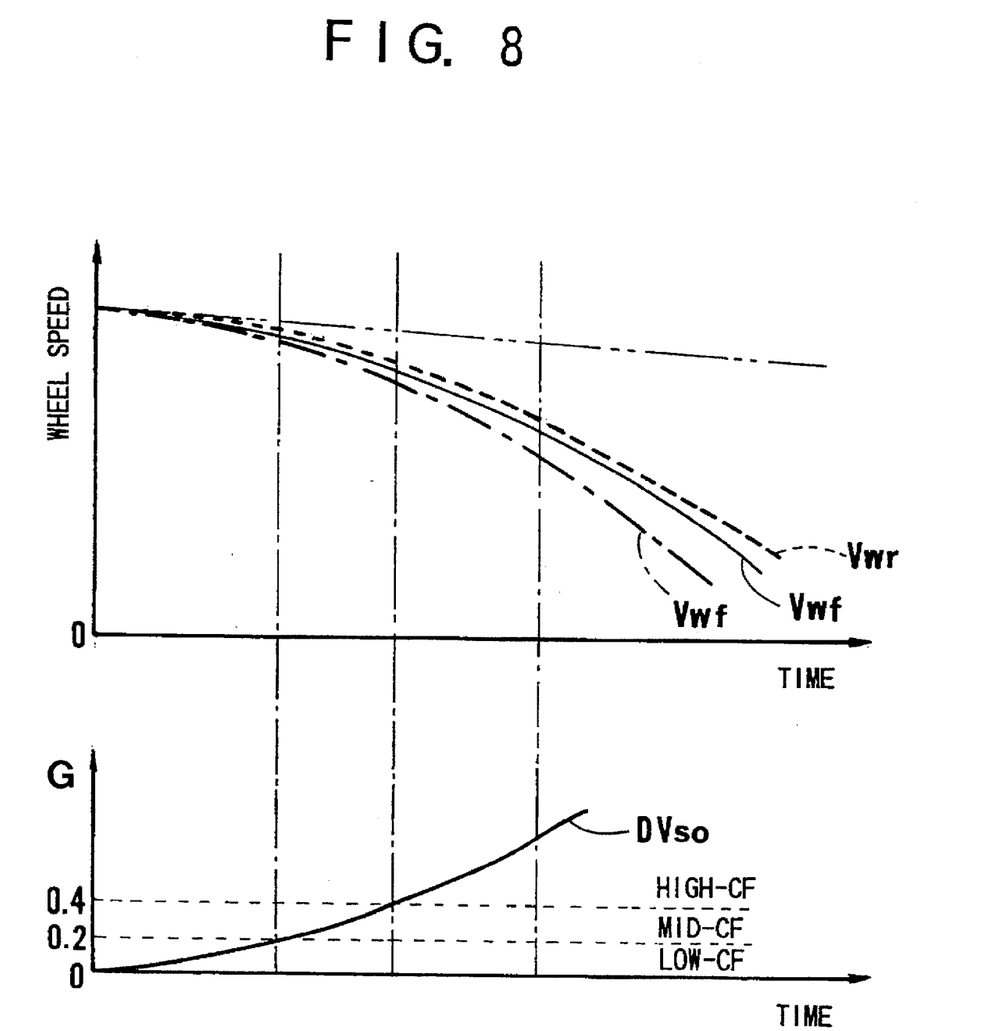
FIG. 8 is a diagram showing the relationship between the variation of wheel speeds and the varying rate of the estimated vehicle speed in the above embodiment of the present invention.

FIG. 7 shows a subroutine for estimating the coefficient of friction of the road surface (road-CF) before the anti-skid control is initiated. It is determined at Step 401 whether the anti-skid control has been initiated or not. Only if it is before the anti-skid control is initiated, the program proceeds to Step 402 and those steps followed thereby. At Step 402, a front wheel speed Vwf (e.g., a wheel speed of the road wheel FR or FL) is subtracted from a rear wheel speed Vwr (e.g., the average of the wheel speeds of the road wheels RR, RL) to provide a wheel speed differential Vd as an absolute value. Then, it is determined at Step 403 if the wheel speed differential Vd is larger than a predetermined value Kv, and if so, the program proceeds to Step 404 and the steps followed thereby. If the wheel speed differential Vd is equal to or less than the predetermined value Kv, the program returns to the main routine in FIG. 4. At Step 404, the varying rate DVso of the estimated vehicle speed is compared with a standard rate (e.g., 0.2 G), and if the former is lower than the latter, the road surface is estimated to be of a low coefficient of friction (low-CF). If it is determined that the varying rate DVso is equal to or more than 0.2 G, the program further proceeds to Step 406 where the varying rate DVso is compared with another standard rate (e.g, 0.4 G). If the varying rate DVso is less than 0.4 G, the program proceeds to Step 407 where the road surface is estimated to be of an intermediate coefficient of friction (mid-CF), and if the varying rate is equal to or more than 0.4 G, the program proceeds to Step 408 where the road surface is estimated to be of a high coefficient of friction (high-CF). An example of the operation is shown in FIG. 8, wherein a solid line Vwf indicates the wheel speed of the front road wheel running on the high coefficient of friction road, a one-dotted chain line Vwf indicates the wheel speed of the front road wheel running on the low coefficient of friction road, and a phantom line Vwr indicates the rear wheel speed provided for the rear road wheels.

Figure 9:
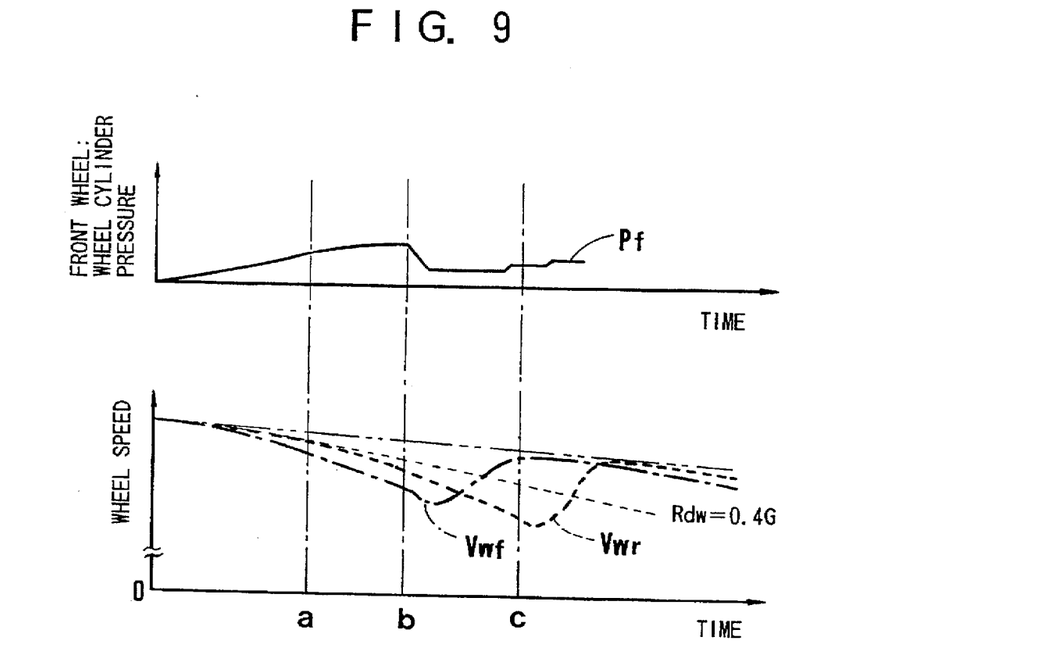
FIG. 9 is a diagram showing the variation of wheel speeds and wheel cylinder pressures during the anti-skid control operation in the above embodiment.
Figure 10:
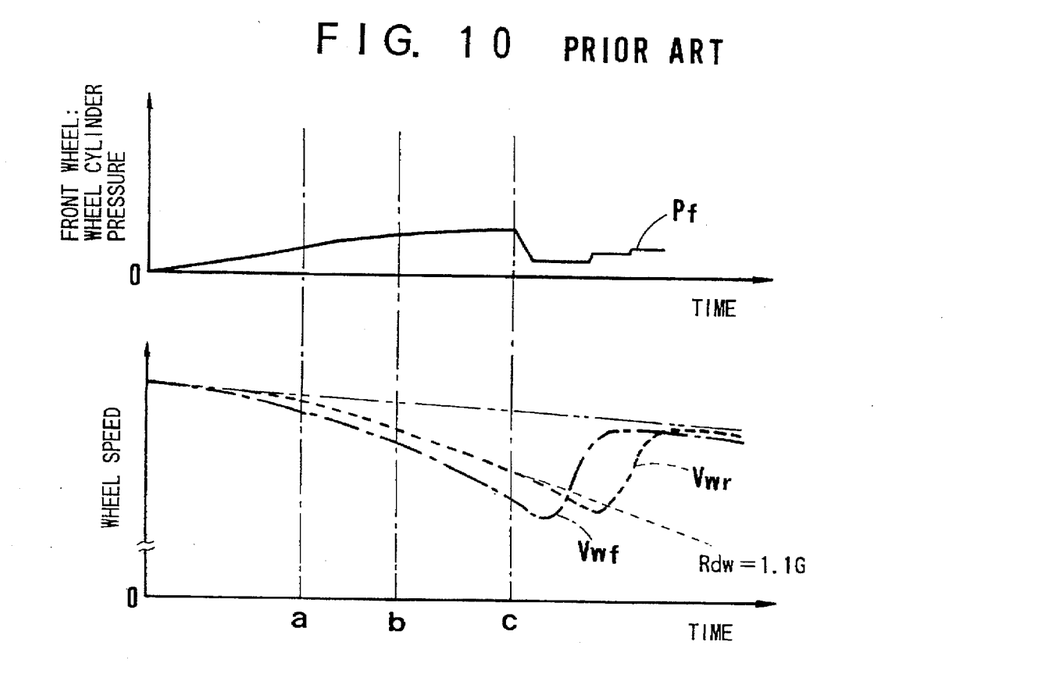
FIG. 10 is a diagram showing the variation of wheel speeds and wheel cylinder pressures during the anti-skid control operation in the prior art.

According to the present embodiment, if the wheel speed differential Vd between the front wheel speed Vwf and the rear wheel speed Vwr exceeds the predetermined value Kv, and if the varying rate DVso of the estimated vehicle speed is less than 0.2 G at the point "a" in FIG. 9 where the anti-skid control is initiated, the road surface is estimated to be of the low coefficient of friction. At the point "b" in FIG. 9, the anti-skid control for a front road wheel is initiated to reduce the wheel cylinder pressure Pf. The point "c" in FIG. 9 corresponds to the point where the pressure decreasing operation is initiated for the anti-skid control in the prior apparatus as shown in FIG. 10. The points "a" and "b" in FIG. 10 correspond to the points "a" and "b" in FIG. 9, respectively. As is clear comparing FIG. 9 with FIG. 10, the coefficient of friction of the road surface has been properly estimated before the anti-skid control operation starts, so that the hydraulic braking pressure can be appropriately controlled immediately after the anti-skid control is initiated. Especially, even if all the road wheels tend to be locked simultaneously with the gradual braking operation applied to the road wheels, the coefficient of friction of the road surface can be estimated properly before the anti-skid control operation starts to execute the hydraulic braking pressure control in accordance with the properly estimated coefficient of friction of the road. Although the above-described embodiment relates to the four-wheel drive vehicle (4 WD), the present invention may be applied to the two-wheel drive vehicle, and applied to the apparatus of a so-called three-channel control system or the like.

Figure 13:
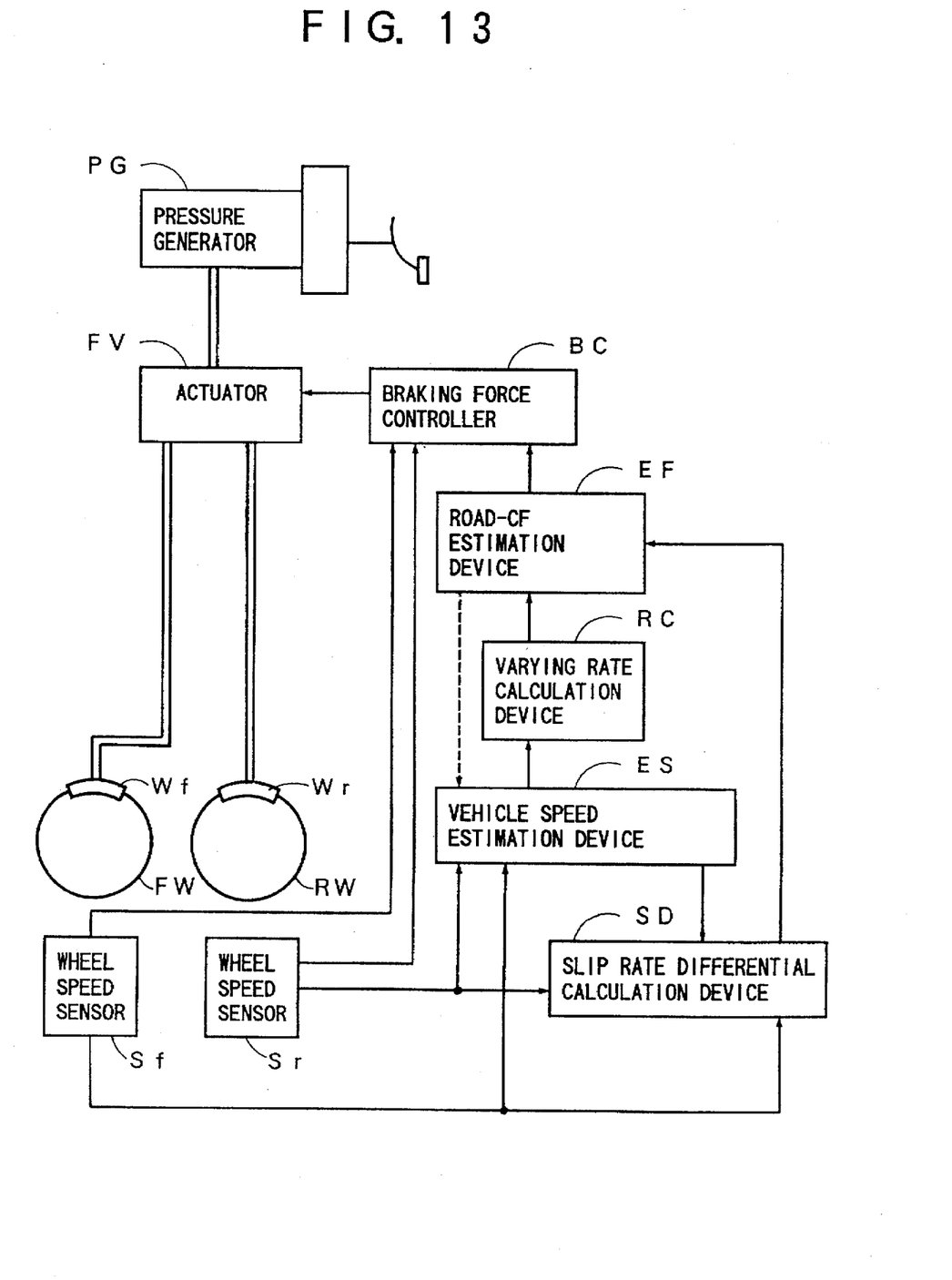
FIG. 13 is a general block diagram illustrating another anti-skid control system according to the present invention.

According to the above-described embodiment, the wheel speed differential between the front and rear wheel speeds is compared with the predetermined value, in the case where the coefficient of friction of the road surface is estimated before the anti-skid control is initiated. However, as shown in FIG. 13 it may be determined if a wheel slip rate differential between the slip rates obtained for the front and rear road wheels exceeds a predetermined value, before the coefficient of friction of the road surface is estimated. In this case, instead of the wheel speed differential Vd at Steps 402, 403 in FIG. 7, the wheel slip rate differential is used, and a predetermined value different from Kv in FIG. 7 is provided for comparing with the same.

It should be apparent to one skilled in the art that the above-described embodiments are merely illustrative of but a few of the many possible specific embodiments of the present invention. Numerous and various other arrangements can be readily devised by those skilled in the art without departing from the spirit and scope of the invention as defined in the following claims.

What is claimed is:

1. An anti-skid control system for controlling a braking force applied to road wheels of an automotive vehicle, comprising:

wheel brake cylinders operatively connected to front and rear road wheels of said vehicle, respectively, for applying braking force thereto;

a hydraulic pressure generator for supplying a hydraulic braking pressure to each of said wheel brake cylinders;

actuating means disposed in each hydraulic circuit communicating said hydraulic pressure generator with each of said wheel brake cylinders for controlling the hydraulic braking pressure in each of said wheel brake cylinders;

wheel speed detection means for detecting wheel speeds of said road wheels, and providing output signals corresponding to the wheel speeds, respectively;

vehicle speed estimation means for calculating an estimated vehicle speed on the basis of the wheel speeds detected by said wheel speed detection means;

varying rate calculation means for calculating a varying rate of the estimated vehicle speed;

front and rear wheels comparison means for comparing the rotational conditions of said front road wheels and said rear road wheels on the basis of at least the wheel speeds detected by said wheel speed detection means;

coefficient of friction estimation means for estimating a coefficient of friction of a road on which said vehicle is running, on the basis of the result of a comparison between the output of said varying rate calculation means and a standard rate, said coefficient of friction estimation means being allowed to estimate the coefficient of friction of the road, only when said front and rear wheels comparison means results in providing more than a predetermined difference between the rotational conditions of said front road wheels and said rear road wheels; and braking force control means for controlling said actuating means in accordance with at least the coefficient of friction estimated by said coefficient of friction estimation means, and in response to the wheel speeds detected by said wheel speed detection means, thereby to control the braking force applied to each of said road wheels.

2. An anti-skid control system as claimed in claim 1, wherein said front and rear wheels comparison means comprises speed differential calculation means for calculating a wheel speed differential between the front wheel speed provided for said front road wheels and the rear wheel speed provided for said rear road wheels on the basis of the wheel speeds detected by said wheel speed detection means, and wherein said coefficient of friction estimation means estimates the coefficient of friction of the road on the basis of the result of a comparison between the output of said varying rate calculation means and the standard rate, which comparison is made only when the output of said speed differential calculation means exceeds a predetermined value.

3. An anti-skid control system as claimed in claim 2, wherein said vehicle speed estimation means includes means for modifying the estimated vehicle speed in accordance with the output of said coefficient of friction estimation means.

4. An anti-skid control system as claimed in claim 2, wherein said varying rate calculation means includes means for obtaining a variation of the estimated vehicle speed caused during a predetermined period of time, and means for dividing the variation by the predetermined period of time to provide the varying rate.

5. An anti-skid control system as claimed in claim 4, wherein said coefficient of friction estimation means includes means for comparing the varying rate calculated by said varying rate calculation means with a plurality of standard rates which provide a plurality of ranges corresponding to a plurality of coefficients of friction, respectively, and selecting one of the coefficients of friction fallen within one of the ranges.

6. An anti-skid control system as claimed in claim 5, wherein said speed differential calculation means includes means for calculating the average of the wheel speeds of said rear road wheels detected by said wheel speed detection means to provide the rear wheel speed.

7. An anti-skid control system as claimed in claim 1, wherein said front and rear wheels comparison means comprises slip rate differential calculation means for calculating a wheel slip rate differential between the front wheel slip rate provided for said front road wheels and the rear wheel slip rate provided for said rear road wheels on the basis of the wheel speeds detected by said wheel speed detection means and the output of said vehicle speed estimation means, and wherein said coefficient of friction estimation means estimates the coefficient of friction of the road on the basis of the result of a comparison between the output of said varying rate calculation means and the standard rate, which comparison is made only when the output of said slip rate differential calculation means exceeds a predetermined value.

8. An anti-skid control system according to claim 7, wherein said vehicle speed estimation means includes means for modifying the estimated vehicle speed in accordance with the output of said coefficient of friction estimation means.

9. An anti-skid control system as claimed in claim 7, wherein said varying rate calculation means includes means for obtaining a variation of the estimated vehicle speed caused during a predetermined period of time, and means for dividing the variation by the predetermined period of time to provide the varying rate.

10. An anti-skid control system as claimed in claim 9, wherein said coefficient of friction estimation means includes means for comparing the varying rate calculated by said varying rate calculation means with a plurality of standard rates which provide a plurality of ranges corresponding to a plurality of coefficients of friction, respectively, and selecting one of the coefficients of friction fallen within one of the ranges.

* * * * *